United States Patent
Singhal

(10) Patent No.: US 10,374,690 B2
(45) Date of Patent: Aug. 6, 2019

(54) AIRBORNE CELL TOWER SYSTEM FOR WIRELESS COMMUNICATIONS IN REMOTE AND RURAL GEOGRAPHIC AREAS

(71) Applicant: Tara Chand Singhal, Torrance, CA (US)

(72) Inventor: Tara Chand Singhal, Torrance, CA (US)

(*) Notice: Subject to any disclaimer, the term of this patent is extended or adjusted under 35 U.S.C. 154(b) by 0 days.

(21) Appl. No.: 14/664,921

(22) Filed: Mar. 23, 2015

(65) Prior Publication Data
US 2015/0280811 A1    Oct. 1, 2015

Related U.S. Application Data

(60) Provisional application No. 61/972,200, filed on Mar. 28, 2014.

(51) Int. Cl.
*H04B 7/185* (2006.01)
*H04W 40/20* (2009.01)

(52) U.S. Cl.
CPC ........ *H04B 7/18504* (2013.01); *H04W 40/20* (2013.01)

(58) Field of Classification Search
CPC ............................ H04B 7/18504; H04W 40/20
See application file for complete search history.

(56) References Cited

U.S. PATENT DOCUMENTS

| | | | | |
|---|---|---|---|---|
| 8,428,580 B1* | 4/2013 | Mitchell | ............ | H04B 7/18506 455/13.4 |
| 8,547,277 B1* | 10/2013 | Mitchell | ............ | H04W 52/282 342/367 |
| 8,812,176 B1* | 8/2014 | Biffle | ........ | B64B 1/62 244/175 |
| 8,874,356 B1* | 10/2014 | Bonawitz | ............ | G08G 5/0034 701/120 |
| 8,897,770 B1* | 11/2014 | Frolov | .............. | H04W 84/06 244/25 |
| 8,948,927 B1* | 2/2015 | Piponi | .............. | H04L 12/6418 244/158.1 |
| 8,996,024 B1* | 3/2015 | Teller | .............. | H04W 84/06 455/452.1 |
| 8,998,128 B2* | 4/2015 | Ratner | .............. | B64B 1/62 244/31 |
| 9,045,213 B1* | 6/2015 | DeVaul | .............. | B64B 1/62 |
| 9,083,425 B1* | 7/2015 | Frolov | .............. | H04B 7/18504 |
| 9,153,854 B1* | 10/2015 | Biffle | .............. | H01Q 1/1292 |
| 9,168,994 B2* | 10/2015 | Ratner | .............. | B64B 1/46 |
| 9,174,720 B1* | 11/2015 | Ratner | .............. | B64B 1/64 |
| 9,211,942 B1* | 12/2015 | Roach | .............. | B64B 1/62 |
| 9,281,554 B1* | 3/2016 | Behroozi | .............. | H01Q 1/28 |
| 9,296,462 B1* | 3/2016 | Brookes | .............. | B64B 1/58 |
| 9,463,862 B2* | 10/2016 | Ratner | .............. | B64B 1/46 |

(Continued)

*Primary Examiner* — Leon Flores
(74) *Attorney, Agent, or Firm* — Steve Roeder, Esq.

(57) ABSTRACT

An airborne cell tower system for providing wireless communication in remote and sparsely populated areas provides wireless communication coverage in that region. The system 10 has an airborne cell tower unit assembly, where the assembly is airborne with the help of a helium balloon. Multiple units are positioned in an air region in a pattern to provide wireless coverage for a specified geographic region to provide wireless communication coverage in that region.

20 Claims, 10 Drawing Sheets

(56) References Cited

U.S. PATENT DOCUMENTS

| | | | | |
|---|---|---|---|---|
| 9,596,020 B2* | 3/2017 | Frolov | ............... | H04B 7/18504 |
| 9,877,208 B2* | 1/2018 | Wieneke | ................ | H04W 16/26 |
| 2007/0281705 A1* | 12/2007 | Bosenbecker | ........ | H04W 60/04 |
| | | | | 455/445 |
| 2009/0072082 A1* | 3/2009 | Arel | ......................... | B64B 1/06 |
| | | | | 244/66 |
| 2013/0175387 A1* | 7/2013 | DeVaul | ................. | G05D 1/042 |
| | | | | 244/31 |
| 2013/0303218 A1* | 11/2013 | Teller | .................... | H04L 47/829 |
| | | | | 455/507 |
| 2014/0014769 A1* | 1/2014 | DeVaul | .................... | B64B 1/62 |
| | | | | 244/97 |
| 2014/0015694 A1* | 1/2014 | Teller | ....................... | B64B 1/40 |
| | | | | 340/946 |
| 2014/0048646 A1* | 2/2014 | DeVaul | .................... | B64B 1/40 |
| | | | | 244/97 |
| 2015/0266560 A1* | 9/2015 | Ratner | ..................... | B64B 1/46 |
| | | | | 244/99 |
| 2015/0280811 A1* | 10/2015 | Singhal | .............. | H04B 7/18504 |
| | | | | 455/431 |
| 2016/0031543 A1* | 2/2016 | Ratner | ..................... | B64B 1/46 |
| | | | | 244/99 |
| 2016/0046387 A1* | 2/2016 | Frolov | ................... | B64C 39/02 |
| | | | | 244/59 |
| 2016/0050011 A1* | 2/2016 | Frolov | ............... | H04B 7/18506 |
| | | | | 455/431 |
| 2016/0050012 A1* | 2/2016 | Frolov | ............... | H04B 7/18504 |
| | | | | 455/431 |
| 2016/0156406 A1* | 6/2016 | Frolov | ............... | H04B 7/18504 |
| | | | | 455/431 |
| 2016/0226573 A1* | 8/2016 | Behroozi | ........... | H04B 7/18504 |
| 2016/0337871 A1* | 11/2016 | Wieneke | ................ | H04W 16/26 |
| 2017/0366250 A1* | 12/2017 | Ovens | ..................... | H01Q 1/28 |

* cited by examiner

At step 70, assembling an air borne cell tower assembly 11 for an air borne cell tower system 10

At step 72, determining a geographic region 28 A & B out of the urban areas that lacks adequate wireless communication system.

At step 74, determining the number of units 11 required for the region 28 A and B At step 76, launching the units 11 in the vicinity of the region 28 A & B At step 78, positioning the assembly 11 in an air field above regions At step 80, provisioning for spare units 11D in the field above regions At step 82, controlling and managing the units 11 from a ground station 60.

At step 84, performing a test operation on the units in the region

At step 86 activating the system 10 for use.

Figure 7

AIRBORNE CELL TOWER SYSTEM FOR WIRELESS COMMUNICATIONS IN REMOTE AND RURAL GEOGRAPHIC AREAS

CROSS REFERENCE

This application claims priority on U.S. Provisional Application Ser. No. 61/972,200, titled "AN AIRBORNE CELL TOWER SYSTEM FOR WIRELESS COMMUNICATIONS IN REMOTE/RURAL GEOGRAPHIC AREAS" filed on Mar. 28, 2014, by Tara Chand Singhal. The contents of the Provisional Application Ser. No. 61/972,200 are incorporated herein by reference.

FIELD OF THE INVENTION

The embodiments relate to improvements in an airborne cell tower system for providing wireless communication coverage and access in remote and sparsely populated geographic areas.

BACKGROUND

Wireless communication service for both voice and data is provided via a wireless cellular network using a network of antennas mounted on buildings and towers that are spread in a region to provide coverage. The coverage depends on having a cell tower in the region and thus these antennas provide a limited range of service, based on coverage provided by these cell towers.

For cost and logistics reasons these cell towers are typically provided and positioned in urban and densely populated areas and are not typically provided in other areas such as remote, mountainous, and rural or sparsely populated areas. Thus, these remote, mountainous, and rural areas do not enjoy the benefit of having wireless communication services. To address this problem, industry provides for satellite communication such as Iridium, a constellation of low earth orbit satellites.

The technology of drones has advanced. Drones are remotely piloted unmanned aircrafts that are being used in a variety of applications, even though they have become popular as weapons of war. Based on some news items, some people believe that drones may be used to provide wireless coverage in such remote areas.

All of these solutions such as Iridium satellites and drones are costly and have logistics and feasibility issues that may make them impractical and unfeasible. Therefore, new ways to address the problem of wireless communication in remote and rural areas is required.

Hence, it is an objective of the embodiments herein to provide for wireless communication service, for both voice and data, in remote, mountainous, and rural or sparsely populated areas. It is also another objective to provide this service as less costly and less logistically complex than other possible solutions.

SUMMARY

The embodiments herein relate to improvements in an airborne cell tower system for providing wireless communication, for both voice and data, in remote, mountainous, and rural or sparsely populated areas. In such areas it is believed, it is not economical or feasible to provide wireless network using ground based cell towers.

The system has a plurality of airborne cell tower unit assemblies, where an assembly is airborne with the help of a helium balloon. Hence this airborne cell tower system provides for an airborne cell tower system where airborne units are arranged in an air space to provide such wireless coverage using prior art handsets.

In addition to providing wireless communication coverage in remote and rural areas, another application of the embodiments herein includes temporary deployment of the system for search and rescue operation in mountainous regions where one, two, or as many as are necessary airborne cell tower units may be deployed over the mountainous area to aid in tracking an injured or lost person or group of people. The injured or lost party would be able to connect to a service provider's wireless network via the deployed airborne cell tower units and contact emergency personnel.

Another application of the embodiments herein would be to quickly deploy the system in an area of natural disaster due to causes such as, floods, tornados, and hurricanes that would have likely destroyed or damaged the ground cell tower based wireless communication equipment and system.

The airborne cell tower unit has the functions of unit management including launch and deployment and a location control management function. In addition the unit has, (ii) a solar cell system coupled with batteries, (iii) a dedicated antenna group providing wireless communication coverage for a ground area and for ground-based systems, (iv) a dedicated antenna group for communicating to other airborne cell tower units, (v) a routing function, and (vi) a communication function.

Multiple units are positioned in an air region and in a pattern to provide wireless coverage for a specified geographic region in order to provide wireless communication services in that region.

These and other aspects of the embodiments herein are further described in detail with the help of the accompanying drawings and the description, where similar numbers are used to identify similar features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 7 is a method diagram of the airborne cell tower wireless network system.

DESCRIPTION

With the help of FIGS. 1, 2, 3, 4 and 5, an airborne cell tower system 10 for providing wireless communication for voice and data in remote, mountainous, and rural areas is described.

Figure 1:
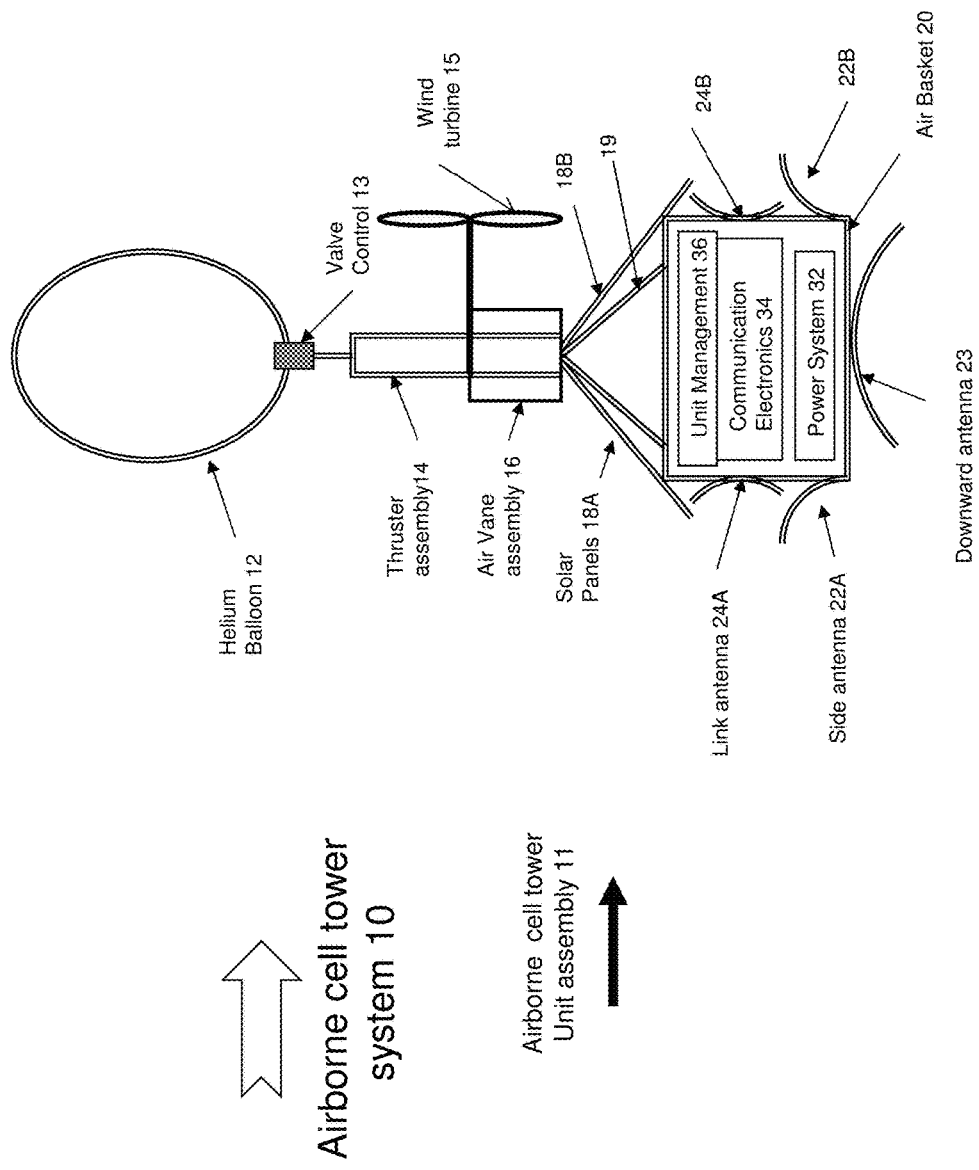
FIG. 1 is an illustration of an embodiment of an airborne cell tower system and airborne cell tower unit assembly for use in wireless communication networks.

As illustrated with the help of FIG. 1, the system 10 has an airborne cell tower assembly unit 11. The assembly unit 11 has a helium air balloon 12, air valve control system 13 for the balloon 12, thruster assembly 14, air vane assembly 16, and an air basket 20 suspended from the balloon via suspension harness 19.

As illustrated in FIG. 1, the basket 20 contains multiple electronic systems. These systems include the power system 32, communication system 34 and unit management system 36. Each of these electronic systems contains a redundant back-up system that resides within the basket 20 and functions as a secondary system in event of failure of the primary system.

The basket 20 is an enclosed container, which protects and provides insulation to the basket electronic elements from extreme weather. The basket 20 may contain an insulating layer and may alternatively have an external reflective layer to enhance the provided thermal insulation, so that the electronics are able to function in the weather conditions that may be experienced in the height in the atmosphere where the system is deployed.

As illustrated in FIG. 1, the unit 11 has solar cell panels 18A and 18B that are mounted near the top of the basket 20 with the help of harness 19. The solar panels may be arranged in an umbrella-like arrangement and/or contain surface prismatic elements to refract indirect sunlight to better capture solar energy with the relative dynamic positioning of the sun to the solar panels and to offer additional protection to the basket 20 from airborne foreign object damage and weather elements.

The energy obtained from the solar panels would serve to recharge onboard batteries as part of power system 32. The onboard batteries provide power to the electronic systems within basket 20, the air vane system 16, and thruster system 14.

In the event that the electrical charge of the batteries falls below a critical threshold level and sufficient solar energy has not yet been obtained from the solar panels, the unit 11 may optionally contain a wind blade turbine 15, oriented in the vertical plane with vertical axis of rotation, to provide an alternate or supplemental means of energy generation for recharging the batteries in power system 32.

A wind blade turbine 15 coupled with a DC generator (not shown) may be used in unit 11. When the unit 11 is airborne at various altitudes, the wind turbine 15 will spin in the horizontal axis only based upon wind speed and direction and accordingly spin a small turbine that is connected to a DC generator which would power the batteries in power system 32. There may be multiple wind blades in different directions that feed a one or more DC generator. The turbines may be used to supplement the electrical power requirements of unit 11.

The basket 20 has mounted on the outside of the basket, a downward facing antenna 23 that would provide communication coverage on the ground that is directly underneath the basket and a group of antennas 22A, 22B, 22C and 22D (22C and 22D not shown) on each of the four sides of the basket that would provide communication coverage on the respective sides of the basket to enhance the overall ground coverage area.

Figure 2A:
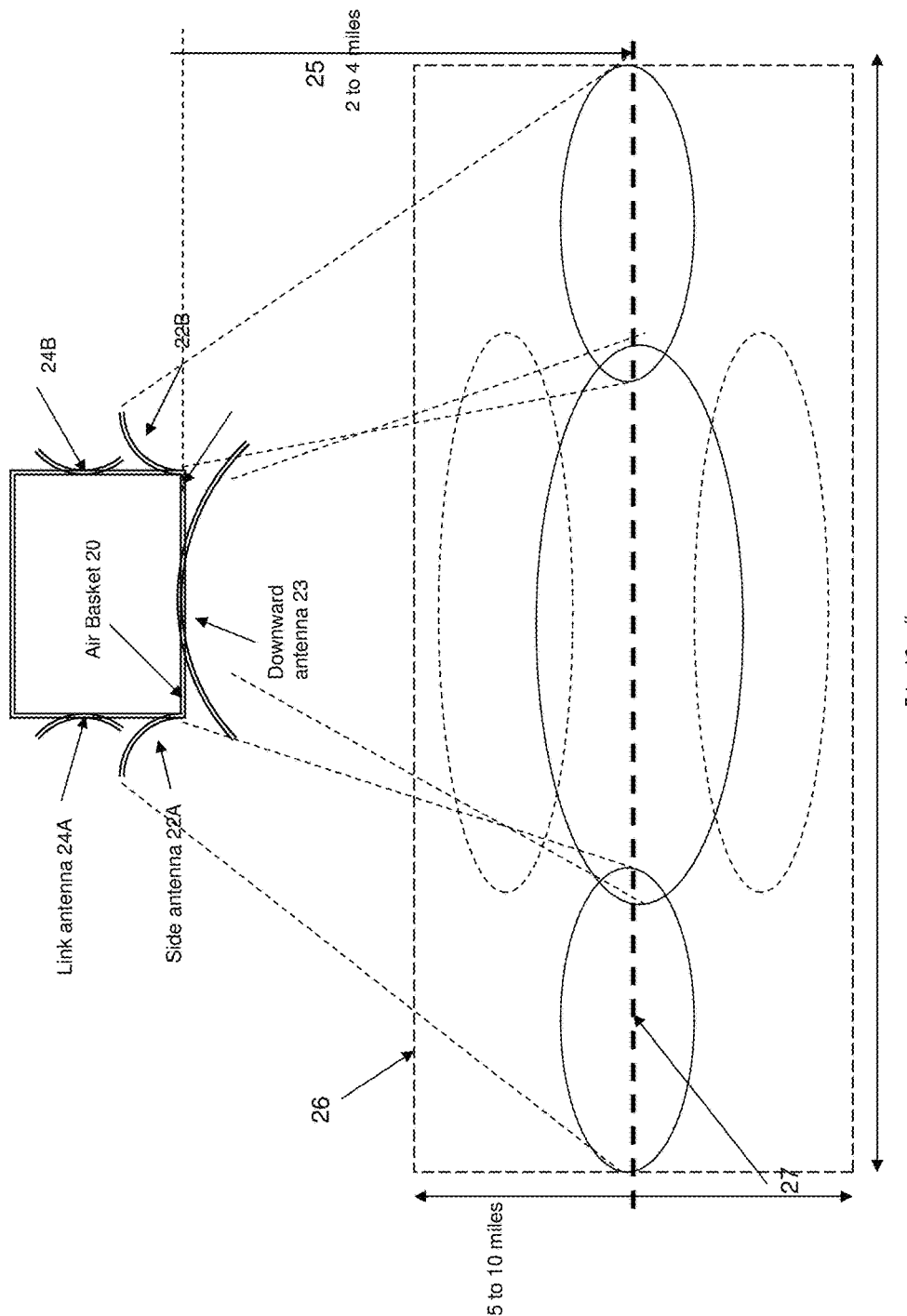
FIGS. 2A and 2B are simplified illustrations of a ground footprint of coverage of an airborne cell tower unit assembly.

As shown with the help of FIG. 2A, this group of antennas (23 and 22A through 22D) provides on the ground plane 27, a communication coverage footprint 26 when the unit 11 with the basket 20 is positioned in the air at a height 25 from the ground plane 27.

It is believed that the coverage footprint 26 may be notionally 25 to 100 square miles, although it could be substantially more than this amount. The coverage footprint 26 will depend on the height of the unit 11 above the ground and the quality and strength of the transmitted and received electromagnetic waves from the group of antennas 23 and 22A through 22D.

The height of the unit 11 above the ground may notionally be 2 to 4 miles but could be different than these amounts depending on atmospheric conditions and/or airspace allocation. It is believed that at heights below approximately 21,000 feet or 4 miles, there are no strong air currents that would pose a stability or destruction danger to the units 11. A height of 2 miles or greater may position the units above the cloud cover.

The basket 20 also has a group of link antennas 24A to 24D (24C and 24D not shown) mounted on all four sides of the basket 20 that provides a horizontal communication link to other similar units 11 that form an airborne network for a region of airborne communication routers. The group of link antennas 24A through 24D will be capable of supporting unit-to-unit link communication for receipt and transmission of airborne network packet data at a nominal distance of 10 mile separation, although the separation distance could be substantially larger depending on communication coverage requirements and the altitude of units 11.

The basket 20 is suspended using harness 19 that is sized to support the weight of the basket 20 with its electronics, battery and system of antennas. Harness 19 is constructed of such a material so as to minimize weight and cost but retain the requisite strength to support the required basket weight. Such materials are prior art materials such as, but not limited to, metal alloys, high-strength plastic polymers, or carbon fiber honeycomb sandwich cores.

Figure 2B:
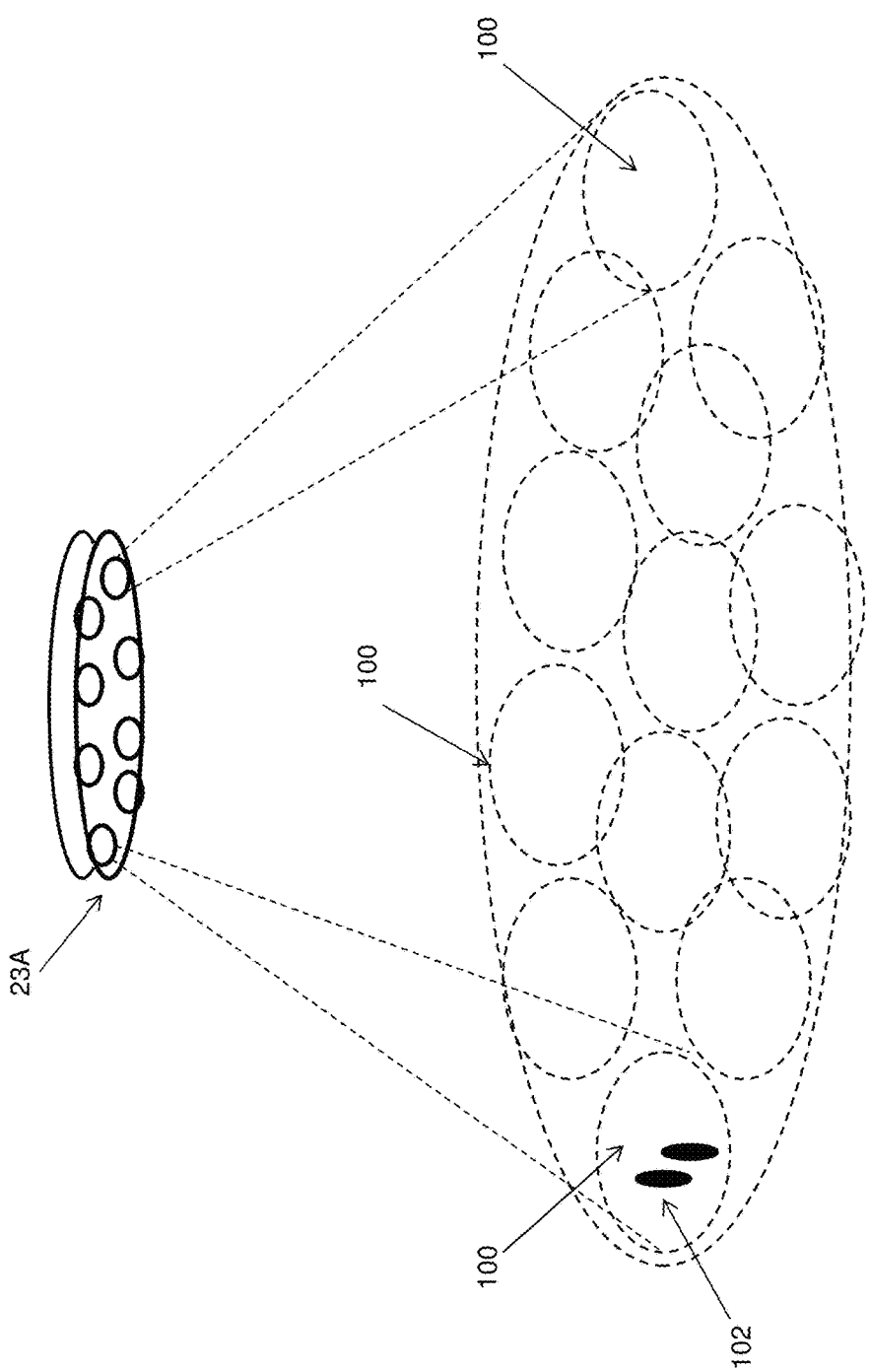

As an alternative to the group of antennas 22A to 22D and 23, there may be single downward antenna 23A as illustrated in FIG. 2B. The antenna 23A would use a different antenna technology using a grid of horns that function both as transmit and receive antenna horns. Each transmit and receive horn provides a limited ground coverage of only a few square miles and is oriented with other horns of the antenna 23A to provide antenna coverage for a large ground area. It is believed, antenna 23A would be more efficient in providing adequate ground coverage without the need for side antennas 22A to 22D.

FIG. 2B is a simplified illustration of the technology of antenna 23A using multiple antenna horns. Each of these antenna horns provide coverage for an area 100, where a single horn may provide ground coverage of 1, 2, 3, or 4 square miles; a large ground area may be covered by having multiple horns in the antenna 23A. As a simplified illustration an antenna 23A may have 16 or 24 or 36 horns, providing for ground coverage of 16 to 144 square miles.

Using antenna 23A, each individual horn and an area 100 covered by each individual horn simulates a cell tower. This pseudo cell tower identification by reference to the unit 11 identification and the horn identification is stored in a Home Location Record (HLR) database of the global telephone network and is used for routing incoming calls to the handsets that are in this cell, much like how the land-based cell towers work in the current wireless networks.

Figure 2C:
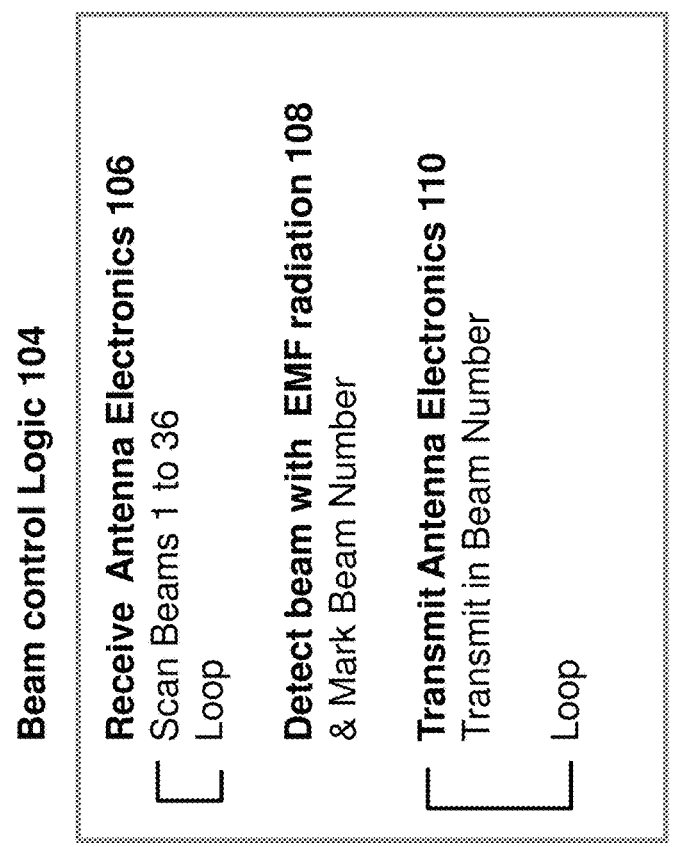
FIG. 2C is a simplified illustration of transmitter and receiver antenna electronic control functions.

FIG. 2C is a simplified illustration of Transmitter Antenna and Receiver Antenna electronics 104 for antenna 23A. Receiver antenna electronics 106 scans the coverage area by cycling the beams 1 to 36 in a sequence where each area 100 may be listened to for a period of time such as ¼ second.

If the receive electronics 106 detects RF energy in a beam, specific to the RF energy that is used for cellular wireless network, then that beam number is identified and marked 108. The transmit antenna electronics then transmits in that beam 110 and thus is able to provide coverage to people 102 in that beam only without wasting transmission energy in other beams where there are no people requiring communication coverage.

The antenna 23A with the help of antenna electronics 104 is able to cycle as well as hop between the different horns and thus is able to receive RF energy from any horn, where people requiring coverage are present and transmit via only those horns, where the RF energy has been detected. This technology of antenna with antenna horns is prior art being used in military satellites to provide communication in a theatre of operation and may be advantageously adapted and used for this application.

As a simplified illustration, if a person with a handset is present in an area 100, of a specific unit, the receiver or listening capability of the horn or beam would hop from horn to horn or area to area within the 36 horns or areas of this airborne unit and within approximately five seconds, would pick up the registration request (R-R) signal being transmitted from this handset, and transmit the R-R signal to the ground-based mobile switching center at the edge of the air borne network to identify the handset.

The transmit beam of this horn or the area then would send an acknowledge signal with the signal strength that was picked up in the R-R signal, enabling the handset to show the signal bars and confirming to the handset that the handset has wireless network capability to send and receive data and voice calls.

The handsets that are powered up are already transmitting R-R signals every few seconds and if they are powered up from power-off mode, immediately begin transmitting their R-R signals. These R-R signals are picked up by a specific horn of the antenna 23A of a specific air borne unit 11 and the location of the handset is then registered in the HLR database, with reference to the unit and the horn, much like a land-based cell tower in the prior art of wireless cellular networks. Thus, anyone anywhere can reach these wireless handsets as their owner move in this area covered by an airborne cell tower unit and system 10.

Using system 10, when a handset broadcasts an R-R signal, it would be picked by multiple contiguous receiver horns on antenna 23A, and each horn would measure and indicate a strength of the received R-R signal, much like a handset on the ground based cellular wireless network, where, the signal is picked up by multiple cell towers in the area of the handset. These signal strengths can be triangulated to determine a precise location of the handset in the geographic area covered by a unit 11. Thus, much, like the prior art ground based cellular network, a call received by emergency personnel from a handset from the airborne cellular network 10 would know the precise location of the handset and would be able to deliver the required emergency services.

As a simplified illustration, a group or an individual mountain hiker can summon help in an emergency, using the system 10 and communicate the nature of the emergency and, enable a helicopter to reach the specific area in the mountain and drop emergency supplies and or evacuate an injured hiker.

The antenna scheme as described above minimizes the transmission energy and transmits only to those areas 100 that are covered by individual horns of the antenna that have people who have activated their cell phones and are transmitting their registration request signals to the wireless network.

The system 10 and units 11 of system 10 provide wireless coverage to prior art handsets that are used for cellular networks without the need to have different type of handsets for the wireless coverage. The prior art related to ground-based cell tower wireless communication system is equally applicable to the system 10, except the system 10 airborne cell tower unit 11 based antenna looks down to provide a coverage area, whereas the prior art cell tower with a group of antennas oriented in different directions, radiates horizontally around structures on the ground.

Thus, it is believed, a benefit of system 10 and unit 11 is that when the antenna is overhead, on an airborne platform, the antenna is able to provide a better or more efficient coverage in a large area without the issues of buildings, and mountains obstructing the operation of prior art cell towers.

Figure 3A:
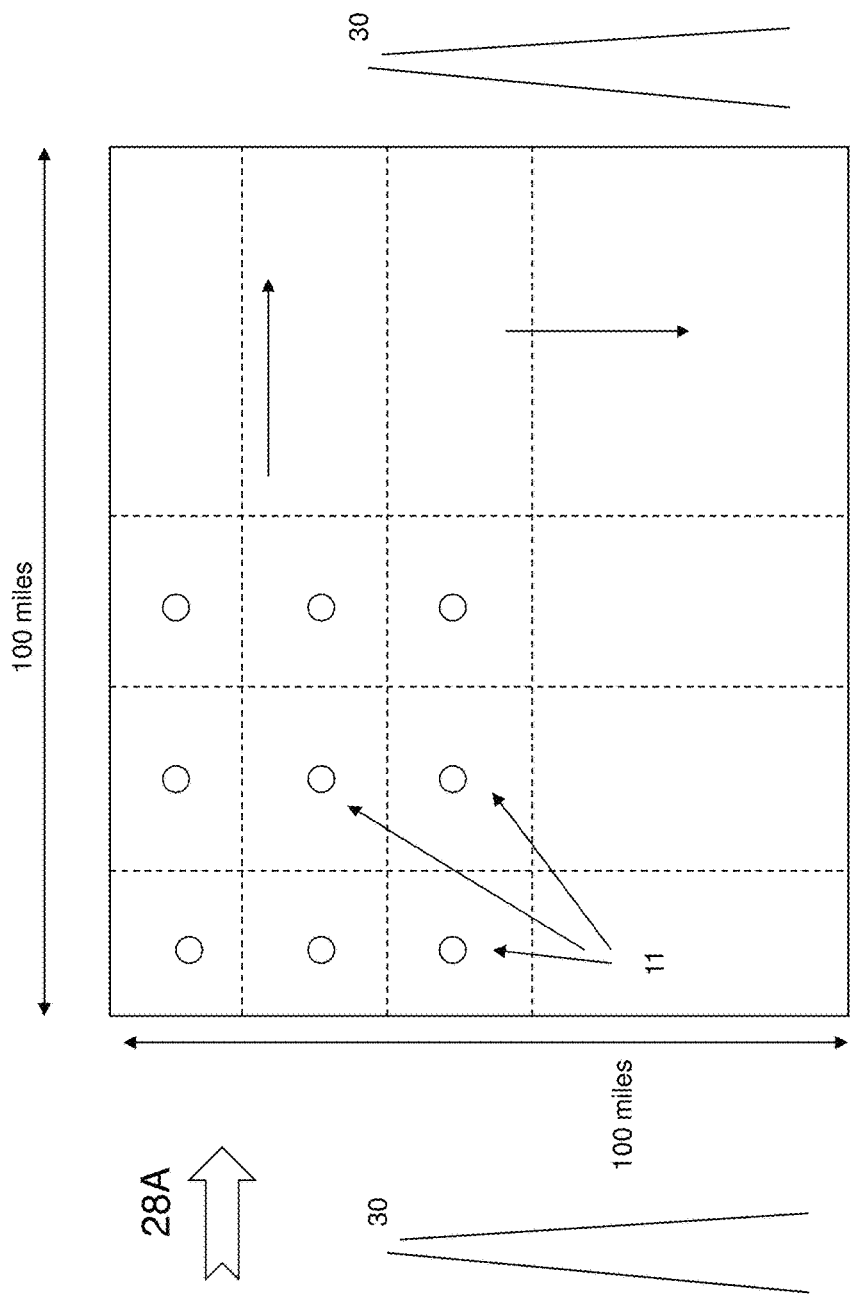
FIGS. 3A and 3B are illustrations of use of multiple airborne cell tower units in geographic regions.
Figure 3B:
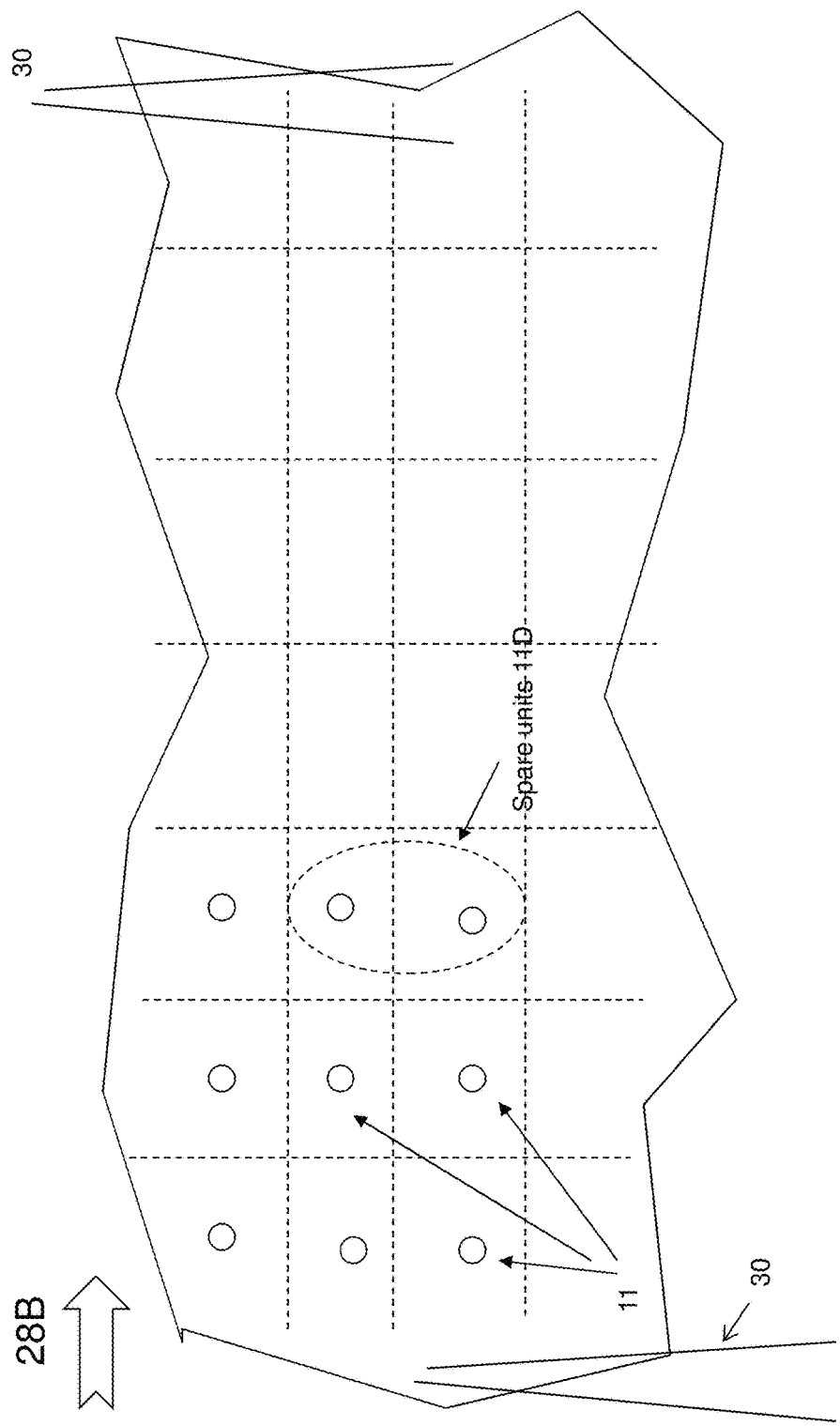

FIGS. 3A and 3B illustrate geographic regions, where 28A is a square region and 28B is an irregularly shaped region that reflects the geographic region where the wireless communication coverage is to be provided. Each region 28A and 28B has a grid of units 11 that are positioned in the surrounding air-space.

Additional units 11D may be used as spare units that can be positioned in the air-space to replace defective units, damaged units, or those that are removed for maintenance. Each region 28A and 28B has access to a service provider's ground-based cell tower 30 at the edge of the regions.

The technology of helium balloons is prior art and is used in weather balloons. Weather balloons are used to collect atmospheric data for weather prediction. Although balloon 12 may preferably be filled with helium, alternatively hydrogen may also be used to fill the balloon 12, due to lower cost. The size and volume of helium to be filled of the helium balloon 12 will be based upon the lift needed to raise the weight of unit 11 to the desired altitude and the buoyancy of helium at the desired altitude.

It is believed the weight of the basket with the payload may nominally be on the order of 100 to 250 lbs or 40 kilograms to 100 kilograms and the helium balloon is sized to carry and support this load. The balloon 12 size will also take into account any extra space needed to account for balloon volume increase based upon air pressure and density at the desired unit 11 altitude.

The material of helium balloon 12 will be highly flexible durable latex material similar to prior art weather balloons but other materials, such as, but not limited to, Chloroprene or polyethylene, are not ruled out. It is believed that the material of balloons is sturdy enough and the unit electronics and equipment would be reliable enough that these units 11 may stay afloat for a long time, believed to be years without maintenance.

It is believed the basket 20 may notionally be 3 feet square in size and also notionally 3 feet in height. That size of the basket would notionally provide for 3×3×3=27 cubic feet of storage space. Such storage space is believed to be adequate to house a redundant set of electronics in the basket as has been described elsewhere herein.

The size of antenna 23 as illustrated with the help of FIG. 2A may be limited by the size of the basket and may notionally be three feet in diameter. However, the size of antenna 23A, as illustrated with the help of FIG. 2B may be larger than the size of the basket 20 and may notionally be six feet in diameter.

The regions 28A and 28B may extend for miles and may be 100 miles or substantially more or less in one dimension. These regions may be national parks, mountainous regions, or other rural areas as well.

Figure 4:
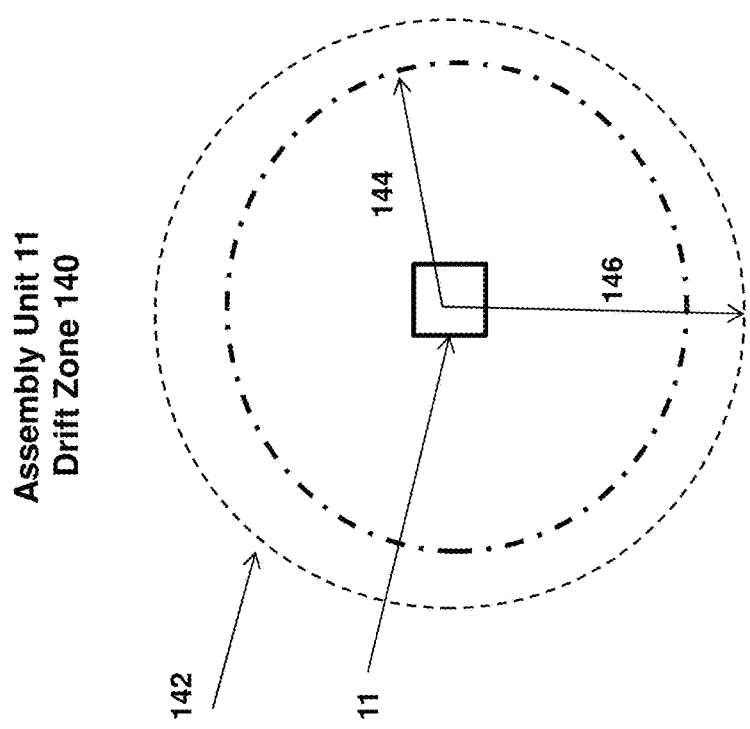
FIG. 4 is a simplified illustration of drift logic for maintaining the location of an airborne cell tower unit assembly in a pre-designated space in an air region.
Figure 4:
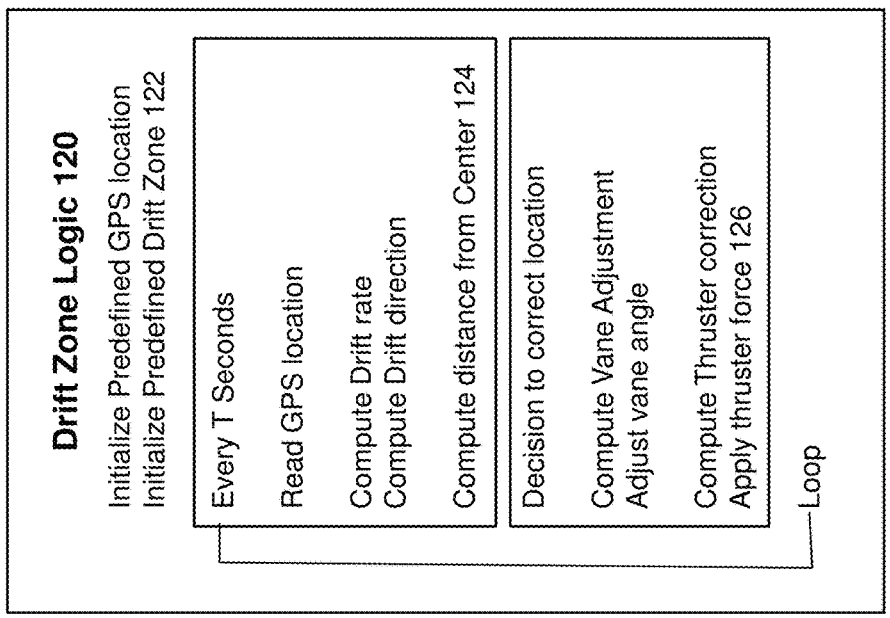

The unit 11 due to varying wind conditions may drift in air-space around a desired location in the air-space. As illustrated in FIG. 4, this drift is managed by drift zone logic 120 to maintain the location of unit 11 in a predefined drift zone 140.

The drift zone 142 may be circular in shape or it may be oval in shape. The size 144 of the drift zone may be limited to a radius 146 of and allowed to drift in a nominal space of about ¼ to one mile radius and in a height of 500 to 1000 feet. When the unit 11 moves a distance 144 from the nominal position the drift logic 120 may be activated.

As illustrated with the help of FIG. 4, the drift logic 120 performs the functions of:

Function 122 is used to initialize the unit location management electronics with a predefined GPS location and initialize predefined drift zone.

Function 124 is then activated every T seconds, reads GPS location, computes drift rate, computes drift direction, and computes distance from nominal center position of unit 11. The time T may notionally be 10 seconds, or one minute, or 10 minutes or more, depending on the wind speed in the area. The unit 11 is also equipped with a sensor to measure wind speed and compute ground speed of the unit. Thus T may be a function of the ground speed of the unit 11. If the ground speed is very low, T may be ten minutes.

Function 126 is activated based on these computations of the drift parameters and a decision is made to correct location of unit 11. For this correction, the function computes vane angle adjustment, adjusts vane angle, computes thruster correction, and applies thruster force. This logic loops back every T seconds. It is desirable to use the wind vectors to keep the unit in a holding pattern such as an oval shape or circular holding pattern depending on the wind conditions.

Figure 5:
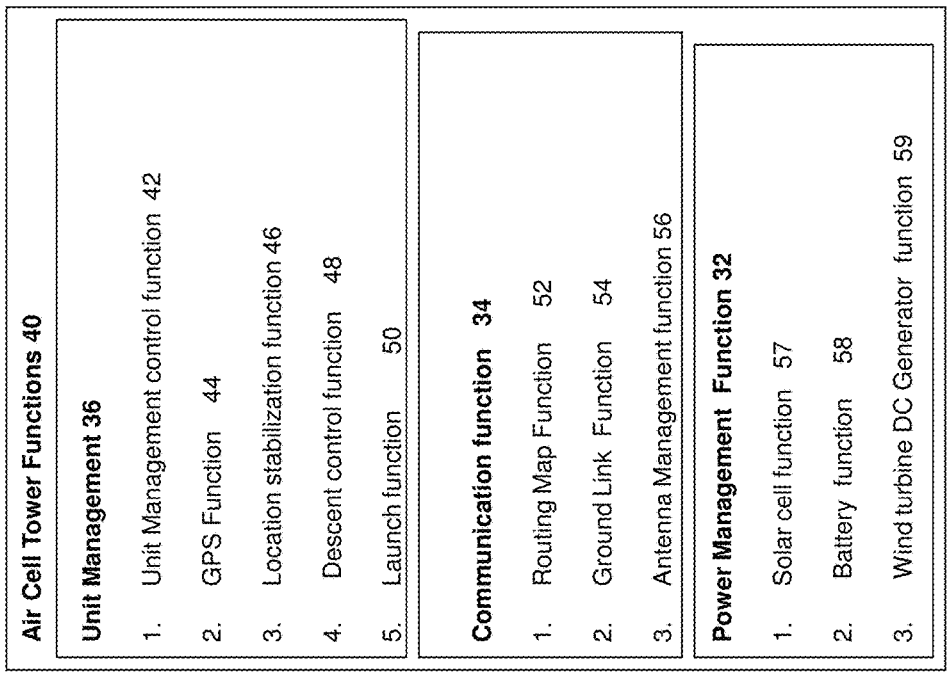
FIG. 5 is a diagram of functions in an airborne cell tower unit of the embodiments herein.

FIG. 5 illustrates the functions 40 in an airborne cell tower unit 11. These functions are power management 32, communications management 34, and unit management 36.

Power Management Function 32

The power management function 32 uses solar cell function 57, battery function 58, and wind turbine function 59 to provide and manage power for the unit 11.

The power management function 32 keeps track of the electrical charge status of the onboard batteries and ensures the energy captured by the solar panels are providing power via solar cell function 57 to recharge the batteries if the batteries electrical charge falls below a threshold level as provided by battery function 58. If the batteries require electrical charge from the solar panels and the solar panels do not have enough power to provide based upon environmental conditions, the power management function will provide for power transfer via wind turbine function 59 from the spinning turbine powered by the wind turbine system 15 to the batteries via battery function 58.

The power management function 32 will provide for maximized efficiency of the onboard batteries based upon minimizing recharging cycles from the power supplied by the solar panels and/or wind turbine such that the batteries electrical charge is only being replenished when falling below a critical threshold. The batteries are prior art and may be lithium ion batteries or another type of battery that is designed to maximize charge potential under potentially harsh environmental conditions.

If the batteries in unit 11 become completely depleted for some time threshold amount, the power management function 32 will provide direct bypass inputs to air valve control system 13 to provide controlled descent of the unit to a pre-determined location on the ground. This action will also serve to send a status indication 64 (prior to complete battery power loss) to ground management system 60 so that the ground management system can send control commands 66 to spare units 11 in regions 28A and 28B to relocate and take over operation of the unit 11 that lost power.

Communication Management Function 34

The communication management function 34 provides the functions of routing map function 52, ground link function 54 and antenna management function 56.

The routing map function 52 uses a routing map of the units 11 in region 28A and 28B received from ground management system 60 to route data packets from one unit 11 to another unit 11 such that the routed data packet is then relayed to a service provider's ground-based cell tower in the global communication network. The routing map function 52 provides inputs to antenna management function 56 such that data packets can be routed via the group of antennas 24A through 24D from one unit 11 to another unit 11. The routing map function 52 also provides inputs to ground link function 54 such that the routed data packet is then relayed to a service provider's ground-based cell tower in the global communication network.

Prior art teaches for a network of routers such as in a global computer network, each router sends a health status data packet to other routers every second, enabling a router to create map of the surrounding routers that helps in deciding which path to take to route the packets. A similar function can be implemented in each of the units of system 10, where each router of the system 10 sends a status signal to each of the other units of the system 10. Such a heart beat status data packet may have the data of, identification of the unit, health of the unit, and the GPS location of the unit, enabling each unit 11 to create a status map of the surrounding units of the system 10.

The ground link function 54 provides inputs to antenna management function 56 to send routed data packets to a service provider's ground-based cell tower via antenna group 22A through 22D and 23. The ground link function 54 processes inputs from routing map function 52 to determine which unit 11 will route data packets to which ground-based cell tower in the vicinity of region 28A and 28B.

The antenna management function 56 allows unit 11 to communicate with an accessible service provider's ground-based cell tower located at the edge of the airborne cell tower system network (i.e. regions 28A or 28B) via antenna group 22A through 22D and 23. The units 11 closest to a ground-based cell tower will receive relayed signals from other local units 11 in the airborne network via antenna group 24A through 24D, which originate from a client's wireless communication device. The antenna management function 56 then commands the antenna group 22A though 22D and 23 to send the signal back down to the service provider's cell tower. The antenna function 56 also relays the signals received from the ground-based cell tower to other units 11 in the airborne network.

Unit Management Function 36

As illustrated in FIG. 5, unit management function 36 provides the functions of unit control from ground 42, GPS function 44, location stabilization function 46, descent control function 48 and launch function 50.

Figure 6:
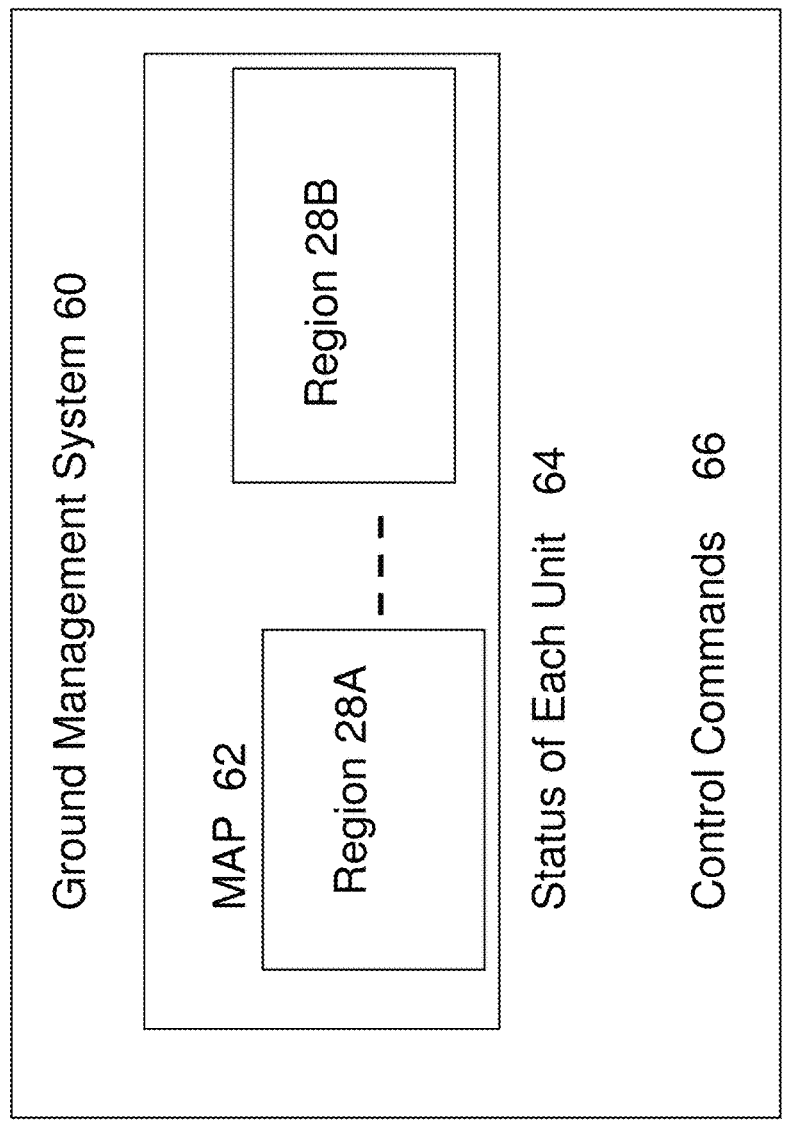
FIG. 6 is an illustration of the ground system for managing the units of an airborne cellular tower wireless system.

The cell tower management control function 42 provides telemetry function and other functions to support a ground management system 60 on the ground as illustrated with the help of FIG. 6. With reference to FIG. 6, a ground management system 60 of the system 10 provides for a map 62 of the units 11 in the regions 28A and 28B, as well as status 64 of each unit 11 and the capability to create and send control commands 66 for each unit 11.

The ground management system 60 calculates a map 62 for regions 28A and 28B based upon the desired wireless communication coverage area of a remote, mountainous, or rural area. The ground management system 60 then transmits these map 62 coverage areas to units 11 which receive and process this map 62 coverage area via cell tower management control function 42. Function 42 utilizes map 62 along with GPS inputs from GPS function 44 for the purposes of determining the location and altitude to fly to. The function 42 then sends this data to the location stabilization function 46 for stabilizing the location of units 11.

The cell tower management control function 42 also provides a status 64 of the unit 11 to the ground management system 60, based upon telemetry data from unit 11 such as health indicators of unit 11 and from optional onboard environmental sensors measuring the surrounding environment, with which an operator of the ground management system 60 can manage the constellation of units 11.

The ground management system 60 can also send control commands 66 to one or more specific units 11 to initiate launch function 50, descent control function 48, or to initiate spare units 11 to relocate and take over operation of units deemed damaged, defective, or requiring maintenance.

The GPS function 44 provides for a GPS antenna and a function to be able to provide GPS location of the unit 11 to the function 42 and functions 46 and 48 and 50.

The location stabilization function 46 uses GPS function 44, thruster system 14 and air vane system 16 to stabilize the location of the unit 11 to a pre-specified location in airspace above a region such as region 28A and 28B based on GPS data and inputs from cell tower management control function 42.

Drift zone logic 120, as part of location stabilization function 46, may be used to maintain the location of the unit 11 in a specified airspace. The drift logic would receive GPS data periodically from the GPS function 44 and compute a drift rate of the unit 11 and compute the adjustments of the air vane system 16 and/or the use of thruster system 14.

The thruster system 14 may be prior art used in communication satellites and scaled down for use in embodiments herein. There may be a single thruster system that is on gimbals capable of being oriented or a multiple thruster system to provide thrust in a pre-computed vector based upon inputs from location stabilization function 46 to move the unit 11 in the air. The thruster system 14 is designed to provide thrust to unit 11 substantially in a left and right direction due to the up direction thrust being provided by the lifting force of helium and/or hydrogen within the balloon 12 and the down direction descent being controlled by the air valve control system 13.

The air vane system 16 is similar to that used for sails in sailboats and is scaled down for the embodiments herein. The air vanes 16 may be used to assist in maintaining the unit 11 positioned in a specific region along with help from the thruster system.

The descent control function 48 uses air valve control system 13 to provide controlled descent of the unit to the ground for maintenance purposes based upon control commands 66 from ground management system 60. The unit 11 is first moved with the help of thrusters to a landing area. The air valve control system 13 is prior art and is used to deflate the balloon.

The descent control function 48 may also provide descent adjustments in aiding location stabilization function 46 to achieve desired altitude based upon wireless communication coverage area requirements as originating from ground management system 60.

The launch function 50 is initiated from the ground management system 60 via control commands 66 and provides telemetry data via status 64 to ground management system 60 during launch and positioning of a unit 11 in a region 28A or 28B. The telemetry data provided by launch function 50 may be based upon health status indicators of unit 11 and/or optional onboard environmental sensors measuring data from the surrounding environment.

It is believed that a unit 11 may be mass manufactured for a cost of around 10,000 to 25,000 dollars. Thus, a geographic region that may spread for 10,000 square miles, comprising a rectangle of 50 by 200 miles may use one hundred of units 11 which would require a capital outlay of in the range of 1 to 2 million dollars. Thus, it is believed a reasonable cost airborne cell tower system 10 may be deployed using the embodiments herein.

To collect revenue and to defray the cost of system 10, a higher rate structure may be implemented for communication of voice and data originating and terminating in system 10. The technology of implementing such a differential rate structure is prior art.

As a simplified illustration of the implementation of this higher rate structure, some years back while the digital network was being built up, the analog network was available and if a digital cell tower was not available in an area, the analog cell tower acted as a back up and advised that a user has the option of using the analog network at a higher rate/per minute.

The technology of antennas is prior art and used in communication satellites. Such antennas are scaled down for use in the embodiments herein. The technology of other systems is also prior art.

The technology of routers and communication is prior art and is scaled for the embodiments herein and is similar to that used in the network of routers on the ground for the Internet.

Method of Operation

As illustrated in FIG. 7, a method of operation for an airborne cell tower system 10 may have the following steps:

At step 70, assembling an airborne cell tower assembly 11 for an airborne cell tower system 10

At step 72, determining a geographic region 28 A and 28 B out of the urban areas that lack adequate wireless communication system.

At step 74, determining the number of units 11 required for the region 28 A and B At step 76, launching the units 11 in the vicinity of the region 28 A and B At step 78, positioning the assembly 11 in an airfield above regions 28 A and 28 B At step 80, provisioning for spare units 11D in the airfield above regions 28A and 28 B At step 82, controlling and managing the units 11 from a ground management system station 60

At step 84, performing a test operation on the units in the region

At step 86, activating the system 10 for use.

The embodiments relate to improvements an airborne cell tower system 10 for providing wireless communication in remote, mountainous, and rural or sparsely populated areas to be able to provide wireless communication coverage in that region.

The system 10 has an airborne cell tower unit assembly, where the assembly is airborne with the help of an helium balloon; the unit has the functions of (i) location control management function, (ii) a solar cell system coupled with a battery, (iii) an antenna group providing coverage for a ground area, (iv) an antenna group for providing link to other units and ground based system, (v) a routing function, (vi) a communication function.

Multiple units are positioned in an air region in a pattern to provide wireless coverage for a specified geographic region to provide wireless communication coverage in that region.

A method for an airborne cell tower system for providing wireless communication in remote and sparsely populated areas, comprising the steps of:

a. assembling an airborne cell tower unit, where the assembly is airborne with the help of a helium balloon;

b. providing in the unit has the functions of (i) location control management function, (ii) a solar cell system coupled with a battery, (iii) an antenna group providing coverage for a ground area, (iv) an antenna group for providing link to other units and ground based system, (v) a routing function, (vi) a communication function; and c. providing multiple units positioned in an air region in a pattern to provide wireless coverage for a specified geographic region to provide wireless communication coverage in that region.

The method also comprising the steps of:

a. providing the location control management function that has (i) a GPS function (ii) a thruster subsystem (iii) an air valve system and using these functions and systems positions a unit in a specified air borne location in the region;

b. providing in the function provides functions of drift management, change in position based on a ground command, and location status to a ground system.

The method also comprising the steps of:

a. the routing function using the link antennas creates and maintains a map of surrounding units;

b. uses the routing map, routes the data packets to a destination.

The method also comprising the steps of:

a. the communication function using the ground coverage antenna group and the link antennas and the routing function routes wireless communications to and from the wireless handsets in the region to other wireless handsets in the global communication network;

b. the function uses a routing map of the units in the region and routes data packets to a destination in the global communication network.

A airborne cell tower system 10 for providing wireless communication in remote and sparsely populated areas has an airborne cell tower unit assembly, the assembly is airborne with the help of an helium balloon in an air region with a pre-determined size, multiple units of the airborne assembly are positioned in a grid pattern in the air region that provides wireless communications coverage for a specified geographic region.

The system has an assembly unit that is positioned on an edge of the air region has wireless line of sight access to a ground based cell tower or a mobile switching center for a communication link to connect to a global telecommunication network. The air region has a size of one of (i) 100 square miles, (ii) 1000 square miles (iii) 10,000 square miles. A shape of the air region is one of, square, rectangular, irregular shape, and longitudinal shape, where the air region covers population or communities of interest without ground cell tower based wireless communication facilities.

The assembly unit is air borne at a minimum height and a maximum height, the minimum height keeps the assembly above cloud level and the maximum height keeps the unit below the strong air currents. Each unit has telemetry electronics and is in communication with a ground station with a command and control function that can assess the health of each unit and reposition the units and deploy spare units on a standby status pre-positioned in the air region.

The assembly unit has functions of (i) unit management function including a location control management function, (ii) telemetry system, (iii) a solar cell system coupled with a storage battery, (iii) an antenna group providing coverage for a ground area, (iv) an antenna group for providing link to other units and ground based system, (v) a routing function, and a (vi) a communication function.

The location control management function has (i) a GPS function (ii) a thruster subsystem (iii) an air valve system and using these functions and systems positions a unit in a specified air borne location in the region. The function provides functions of drift management, change in position based on a ground command, and location status to a ground system.

The routing function using the link antennas creates and maintains a map of surrounding units and uses the routing map, routes the data packets to a destination.

The communication function using the ground coverage antenna group and the link antennas and the routing function routes wireless communications to and from the wireless handsets in the region to other wireless handsets in the global communication network. The function uses a routing map of the units in the region and routes data packets to a destination in the global communication network.

The antenna function has an antenna group for providing link to other units and ground based system; the antenna group is mounted on the four side of the unit with a communication pattern that is substantially horizontal to be able to communicate with other units in the near vicinity as part of a grid of units. The antenna function in selected units has an antenna to communicate with a ground based cell tower system to be able to link the units to a national communication network.

A method for an airborne cell tower system for providing wireless communication in remote and sparsely populated areas, where all the steps may not be used or used in the order specified has the steps of:

a. assembling an airborne cell tower unit, where the assembly is airborne with the help of a helium balloon;

b. providing multiple units positioned in an air region in a pattern to provide wireless coverage for a specified geographic region to provide wireless communication coverage in that region;

c. providing in the unit functions of, (i) unit management function including a location control management function, (ii) telemetry system, (iii) a solar cell system coupled with a storage battery, (iii) an antenna group providing coverage for a ground area, (iv) an antenna group for providing link to other units and ground based system, (v) a routing function, and a (vi) a communication function.

d. providing the location control management function that has (i) a GPS function (ii) a thruster subsystem (iii) an air valve system and using these functions and systems positions a unit in a specified air borne location in the region;

e. providing in the function provides functions of drift management, change in position based on a ground command, and location status to a ground system.

f. positioning an assembly unit that is positioned on an edge of the air region has wireless line of sight access to a ground based cell tower or a mobile switching center for a communication link to connect to a global telecommunication network.

g. positioning the assembly in air at a minimum height and a maximum height, the minimum height keeps the assembly above cloud level and the maximum height keeps the unit below the strong air currents.

h. the routing function using the link antennas creates and maintains a map of surrounding units;

i. uses the routing map, routes the data packets to a destination.

j. the communication function using the ground coverage antenna group and the link antennas and the routing function routes wireless communications to and from the wireless handsets in the region to other wireless handsets in the global communication network;

k. the function uses a routing map of the units in the region and routes data packets to a destination in the global communication network.

A method for an airborne cell tower system, where all the steps may not be used or used in the order specified has the steps of:

a. assembling an air borne cell tower assembly for an air borne cell tower system;

b. determining a geographic region in remote areas that lack adequate wireless communication system;

c. determining the number of units required for the region;

d. launching the units in the vicinity of the region;

e. using a ground based command and control system and positioning the assembly units in an air region above the geographic region.

g. provisioning for spare units in the field above regions;

h. performing a test operation on the units in the region.

i. controlling and managing the units from a ground station;

j. activating the system for use.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. An airborne cell tower system for providing wireless communication, the system comprising:

multiple units of an airborne cell tower unit assembly, wherein the airborne cell tower unit assembly is tethered to a helium balloon and is airborne with the help of the helium balloon, and wherein the airborne cell tower unit assembly has electronics and antennas to provide wireless communications coverage to mobile wireless devices;

a ground based computer system, wherein the ground based computer system is configured with a central processing unit (CPU), a memory and a system management logic operating therein, wherein the system management logic is configured to position and maintain multiple units of the airborne cell tower unit assembly in a grid pattern in an air region, wherein the multiple units of the airborne cell tower unit assembly provide wireless communications coverage for a specified geographic region;

each unit of the multiple units of the airborne cell tower unit assembly is configured with a unit management computer, wherein the unit management computer is configured with a CPU, a memory, and a drift zone logic operating therein;

the unit management computer is configured additionally with a global positioning system (GPS) receiver and a GPS function, wherein the GPS function is configured for computing a location of the airborne cell tower unit assembly;

the drift zone logic is configured to receive a periodic input of the location of the airborne cell tower unit assembly from the GPS function and is configured to output control signals to a location control system of the airborne cell tower unit assembly that maintains the location of the airborne cell tower unit assembly in a pre-defined drift zone of a specified air borne location in the air region;

the drift zone logic is further configured to maintain the location of the airborne cell tower unit assembly in the air region within an height envelope of approximately two to four miles, thereby maintain the airborne cell tower unit assembly above cloud cover and below high winds.

2. The system as in claim 1, comprising:

the system management logic is configured to being initialized with coordinates of the air region and is configured to receive and receives GPS location data from each of the multiple units, selects an individual unit and sends commands to the unit management computer of the individual unit for positioning the individual unit on an edge of the air region, wherein the edge of the air region provides a wireless line of sight access to a ground based cell tower or a mobile switching center for establishing a communication link to connect the system to a global telecommunication network.

3. The system as in claim 1, comprising:

the system management logic is configured to define and defines the air region with GPS coordinates with a size of one of (i) 100 square miles, (ii) 1000 square miles (iii) 10,000 square miles;

the system management logic being configured to input GPS coordinates of the air region that creates a shape of the air region from one of, square, rectangular, irregular shape, and longitudinal shape by defining GPS coordinates of a boundary of the air region, where the air region covers population or communities of interest which lack communication capabilities.

4. The system as in claim 1, comprising:

the system management logic is configured to position and positions the cell tower unit assembly air borne in air above a minimum height and below a maximum height above ground, wherein maintaining the unit assembly above the minimum height keeps the unit assembly above cloud level and maintaining the unit assembly below the maximum height keeps the unit assembly below a region of strong air currents.

5. The system as in claim 1, comprising:

the system management logic is configured to provide and provides a telemetry interface logic for sending and receiving telemetry data with each cell tower unit assembly, wherein each unit assembly has telemetry electronics and is in communication with the ground based computer system, wherein the ground based computer system has a computer with a memory and a CPU, and therein stored in the memory and operating in the CPU is a command and control logic that can assess the health of each cell tower unit assembly from the telemetry data and reposition the cell tower unit assembly for maintenance and deploy spare cell tower unit assemblies that are pre-positioned on a standby status in the air region.

6. An airborne cell tower unit assembly comprising:
sub-assemblies of (i) a unit management computer configured with a central processing unit (CPU), a memory and a logic operating therein, wherein the logic provides a location control management function, wherein the location control management function is configured to receive a periodic input of the location of the airborne cell tower unit assembly from a global positioning system (GPS) function and is configured to output control signals to a location control system of the airborne cell tower unit assembly that maintains the location of the airborne cell tower unit assembly in a pre-defined drift zone of a specified air borne location in the air region and is further configured to maintain and maintains the location of the unit assembly in the air region within an height envelope of approximately two to four miles, thereby maintain the unit assembly above cloud cover and below high winds;
(ii) a telemetry system computer configured with a CPU, a memory and a logic operating therein, wherein the logic provides telemetry functions, (iii) a solar cell system computer configured with a CPU, a memory and a logic operating therein, wherein the logic provides management of the solar panels that are coupled with a storage battery, (iv) an antenna group computer configured with a CPU, a memory and a logic operating therein, wherein the logic provides antenna coverage for a ground area, (v) a second antenna group configured with a CPU, a memory and a logic operating therein, wherein the logic provides communication links to other cell tower units and a ground based system, (vi) a routing computer configured with a CPU, a memory and a routing logic operating therein, wherein the routing logic provides routing of communication signals, and (vii) a communication computer configured with a CPU, a memory and a logic operating therein, wherein the logic provides receiving and transmitting communication signals.

7. The assembly as in claim 6, the airborne cell tower unit further comprising:
(viii) a GPS computer configured with a CPU, a memory and a logic operating therein, wherein the logic provides GPS function for location determination, (ix) a thruster subsystem computer configured with a CPU, a memory and a logic operating therein, wherein the logic provides control of thrusters, (x) an air valve system computer configured with a CPU, a memory and a logic operating therein, wherein the logic provides control of the air valve system, (xi) a drift management computer configured with a CPU, a memory and a logic operating therein, wherein the logic, by computing and implementing a change in position of the unit based on a ground command, and sending a GPS location status of the unit to a ground system; and
using these sub-assemblies (viii), (ix), (x) and (xi) the assembly positions a unit in a specified air borne location in an air region.

8. The assembly as in claim 6, comprising:
the routing logic configured to use the link antennas to create and maintain a routing map of the airborne cell tower units that are positioned around a airborne cell tower unit;
the routing logic configured to use the routing map, to route data packets to a destination.

9. The assembly as in claim 6, comprising:
the airborne cell tower unit assembly configured to route wireless communications to and from wireless handsets in a geographic region to other wireless handsets in a global communication network;
the airborne cell tower unit assembly configured to use a routing map of the airborne cell tower units in the region and routes data packets to a destination in the global communication network.

10. The assembly as in claim 6, comprising:
the airborne cell tower unit assembly configured to provide an antenna group for providing links to other airborne cell tower units and ground based system; wherein antennas of the antenna group are mounted on a four sides of the airborne cell tower unit with a communication pattern to be able to communicate with other airborne cell tower units in vicinity as part of a grid of airborne cell tower units;
the airborne cell tower unit assembly configured to use selected units to communicate with a ground based cell tower system to be able to link the units to a national communication network.

11. A method for an airborne cell tower system for providing wireless communication, comprising the steps of:
providing multiple units of an airborne cell tower unit assembly, wherein the airborne cell tower unit assembly is tethered to a helium balloon and is airborne with the help of the helium balloon, and wherein the airborne cell tower unit assembly has electronics and antennas to provide wireless communications coverage to mobile wireless devices;
providing a ground based computer system, wherein the ground based computer system is configured with a central processing unit (CPU), a memory and a system management logic operating therein, wherein the system management logic is configured to position and maintain multiple units of the airborne assembly in a grid pattern in an air region, wherein the multiple units provide wireless communications coverage for a specified geographic region;
configuring each unit of the multiple units of an airborne cell tower unit assembly with a unit management computer, wherein the unit management computer is configured with a CPU, a memory, and a drift zone logic operating therein;
configuring additionally the unit management computer with a global positioning system (GPS) receiver and a GPS function, wherein the GPS function is configured for computing a location of the airborne cell tower unit assembly;
configuring the drift zone logic to receive a periodic input of the location of the airborne cell tower unit assembly from the GPS function and is configured to output control signals to a location control system of the airborne cell tower unit assembly that maintains the location of the airborne cell tower unit assembly in a pre-defined drift zone of a specified air borne location in the air region;
further configuring the drift zone logic to maintain and maintains the location of the unit assembly in the air region within an height envelope of approximately two to four miles, thereby maintain the unit assembly above cloud cover and below high winds.

12. The method as in claim 11, comprising the steps of:
configuring the unit management computer with logics for, (i) a management function for a unit location control, (ii) a telemetry function, (iii) a management function for a solar cell system coupled with a storage battery, (iv) a management function for an antenna group providing coverage for a ground area, (v) a management function for an antenna group for providing link to other units and ground based system, (vi) a routing management function, and a (vii) a communication management function.

13. The method as in claim 12, comprising the steps of:
configuring the unit management computer with logics for the location control management function, wherein the location control management function has (viii) a GPS function (ix) a thruster subsystem (x) an air valve system and wherein using these functions and systems the location control management function positions a unit in a specified air borne location in the region;
configuring the unit management computer with sub-functions of drift management, for managing drift of the unit, computing and implementing a change in position of the unit based on a ground command, and sending a GPS location status to a ground system.

14. The method as in claim 12, comprising the steps of:
configuring the system management logic by providing the routing management function using the link antennas to create and maintain a routing map of the unit assemblies and;
using the routing management function and the routing map, routing data packets to a destination.

15. The method as in claim 12, comprising the steps of:
configuring the airborne cell tower unit system by routing wireless communications to and from wireless handsets in a geographic region to other wireless handsets in a global communication network;
using by the airborne cell tower unit system a routing map of the airborne cell tower units in the region and routing data packets to a destination in the global communication network.

16. The method as in claim 11, comprising the steps of:
configuring the system management logic by initializing coordinates of an air region and receiving GPS location data from each of the multiple units, selecting an individual unit and sending commands to the unit management computer for positioning the individual unit on an edge of the air region that has wireless line of sight access to a ground based cell tower or a mobile switching center for a communication link to connect to a global telecommunication network.

17. The method as in claim 11, comprising the steps of:
configuring the system management logic by positioning the assembly air borne in air above a minimum height and below a maximum height above ground, wherein, maintaining the unit assembly above the minimum height keeps the assembly above cloud level and maintaining the unit assembly below the maximum height keeps the unit assembly below a region of strong air currents.

18. A method for creating an airborne cell tower system, wherein the airborne cell tower system is comprised of multiple airborne cell tower assembly units, comprising the steps of:
configuring an airborne cell tower system computer for launching the multiple airborne cell tower assembly units;
determining a geographic region in remote areas that lack wireless communication system and determining the number of airborne cell tower assembly units required for the geographic region;
provisioning the multiple assemblies of the air borne cell tower assembly and launching the multiple airborne cell tower assembly units in the geographic region;
providing in each of the air borne cell tower assembly unit a unit management computer and a global positioning system (GPS) receiver, wherein the unit management computer has been configured with a central processing unit (CPU), a memory, and resident in the memory and operating in the CPU, a drift zone logic and a GPS function;
maintaining, by the drift zone logic and the GPS function, the location of the air borne cell tower assembly unit in a pre-defined drift zone for positioning the airborne cell tower assembly unit in a specified air borne location in the air region.

19. The method for an airborne cell tower system of claim 18, comprising the steps of:
provisioning for spare airborne cell tower assembly units in a field area in the vicinity of the air region;
performing a test operation on the air borne cell tower assembly in the air region.

20. The method for an airborne cell tower system of claim 18, comprising the steps of:
controlling and managing the units with the airborne cell tower system computer at a ground station; and
activating the air borne cell tower system for operational use.

* * * * *